United States Patent
Albertson

(10) Patent No.: US 7,232,401 B2
(45) Date of Patent: Jun. 19, 2007

(54) METHOD OF COMPENSATING TORQUE AT CYLINDER SWITCHING ON A DOD ENGINE WITH ELECTRIC PARALLEL HYBRID

(75) Inventor: William C. Albertson, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 44 days.

(21) Appl. No.: 10/766,100

(22) Filed: Jan. 28, 2004

(65) Prior Publication Data

US 2005/0164826 A1   Jul. 28, 2005

(51) Int. Cl.
*B60K 5/08* (2006.01)
*B60K 1/02* (2006.01)
*F02B 75/06* (2006.01)

(52) U.S. Cl. .................. 477/2; 477/3; 123/192.1
(58) Field of Classification Search .................. 477/2, 477/3, 7; 180/65.2, 65.3, 65.4; 123/192.1, 123/179.28
See application file for complete search history.

(56) References Cited

U.S. PATENT DOCUMENTS

| 5,881,559 | A | * | 3/1999 | Kawamura | 60/597 |
|---|---|---|---|---|---|
| 6,405,701 | B1 | * | 6/2002 | Masberg et al. | 123/192.1 |
| 6,581,705 | B2 | * | 6/2003 | Phillips et al. | 180/65.2 |
| 6,629,024 | B2 | * | 9/2003 | Tabata et al. | 701/22 |
| 6,691,807 | B1 | * | 2/2004 | Bhavsar et al. | 180/65.2 |
| 6,806,667 | B1 | * | 10/2004 | Sasaki et al. | 318/432 |
| 6,834,632 | B2 | * | 12/2004 | Kataoka et al. | 123/179.4 |
| 6,868,674 | B2 | * | 3/2005 | Tabata et al. | 60/706 |
| 6,876,098 | B1 | * | 4/2005 | Gray, Jr. | 290/40 D |
| 2003/0217877 | A1 | * | 11/2003 | Tatara et al. | 180/65.2 |
| 2005/0049108 | A1 | * | 3/2005 | Nishizawa et al. | 477/37 |
| 2005/0056475 | A1 | * | 3/2005 | Roberts | 180/165 |
| 2006/0032684 | A1 | * | 2/2006 | Rayl | 180/65.2 |
| 2006/0166783 | A1 | * | 7/2006 | Tamai et al. | 477/7 |

FOREIGN PATENT DOCUMENTS

JP       2004162670 A   *   6/2004

* cited by examiner

*Primary Examiner*—Tisha Lewis
(74) *Attorney, Agent, or Firm*—Christopher DeVries

(57) ABSTRACT

A method for managing torque in a hybrid electric vehicle uses a displacement on demand (DOD) internal combustion engine (ICE), an electric machine and a battery. The method includes smoothing disturbances in ICE torque during a DOD transition using the electric machine.

23 Claims, 6 Drawing Sheets

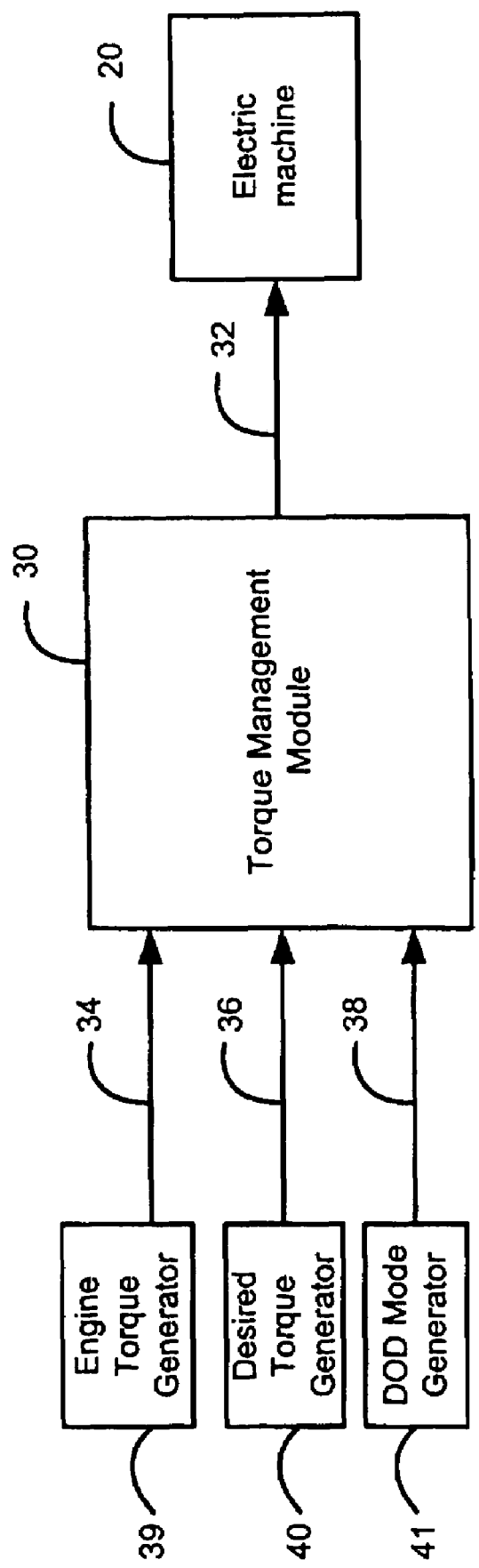

METHOD OF COMPENSATING TORQUE AT CYLINDER SWITCHING ON A DOD ENGINE WITH ELECTRIC PARALLEL HYBRID

FIELD OF THE INVENTION

The present invention relates to an engine control system for vehicles, and more particularly to a torque management system for displacement on demand (DOD) engines in hybrid electric vehicles (HEVs).

BACKGROUND OF THE INVENTION

There is an increasing demand to improve fuel economy, reduce emissions, and reduce noise levels of vehicles. As an alternative to the internal combustion engine (ICE), automotive manufacturers have developed hybrid powertrains that include both an electric traction motor and an internal combustion engine. During operation, HEVs use one or both of the power sources to improve efficiency.

The HEVs use either a parallel drivetrain configuration or a series drivetrain configuration. In the parallel HEV, the electric motor works in parallel with the ICE to combine the power and range advantages of the engine with the efficiency and the electrical regeneration capability of the electric motor. In the series HEV, the ICE drives an alternator to produce electricity for the electric motor, which drives a transaxle. This allows the electric motor to assume some of the power responsibilities of the ICE, thereby permitting the use of a smaller and more efficient engine.

In both configurations, the electric machine stores energy in batteries and uses the stored energy to power the vehicle. The HEV shuts down the ICE when the vehicle is stopped or idling. The electric machine propels the vehicle and eventually restarts the ICE. The electric machine stores braking energy in the batteries during regenerative braking.

The ICE in the HEV may include an engine control system that deactivates cylinders under low load situations. For example, an eight cylinder engine can be operated using four cylinders to improve fuel economy by reducing pumping losses. This process is generally referred to as displacement on demand (DOD). As used herein, an activated mode refers to operation using all of the engine cylinders. A deactivated mode refers to operation using less than all of the cylinders of the engine (one or more cylinders not active). An activation transition mode refers to a transition from the deactivated mode to the activated mode. A deactivation transition mode refers a to transition from the activated mode to the deactivated mode.

To smoothly transition between the activated and deactivated modes, the ICE preferably produces torque with a minimum of disturbances. Otherwise, the transitions will not be transparent to the driver. In other words, excess torque will cause engine surge and insufficient torque will cause engine sag, both of which degrade the driving experience. Conventional spark retard techniques have been used to compensate for the momentary torque increase during the transitions. Retarding the spark delays the time to peak pressure which reduces the torque output. Such techniques are undesirable in that they reduce the overall torque output of the engine.

SUMMARY OF THE INVENTION

A method for managing torque in a hybrid electric vehicle according to the present invention uses a displacement on demand (DOD) internal combustion engine (ICE), an electric machine and a battery. The torque management method includes smoothing disturbances in ICE torque during a DOD transition using the electric machine.

In one other feature of the invention, electricity is generated from excess ICE torque when the ICE torque is greater than a desired torque. The generated electricity is stored in the battery.

In yet another feature of the invention, the electric machine is used to supply torque when the ICE torque is less than a desired torque. The electric machine torque is supplied in addition to the ICE torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a functional block diagram of the torque management module;

DETAILED DESCRIPTION OF THE PREFERRED EMBODIMENTS

Figure 1:
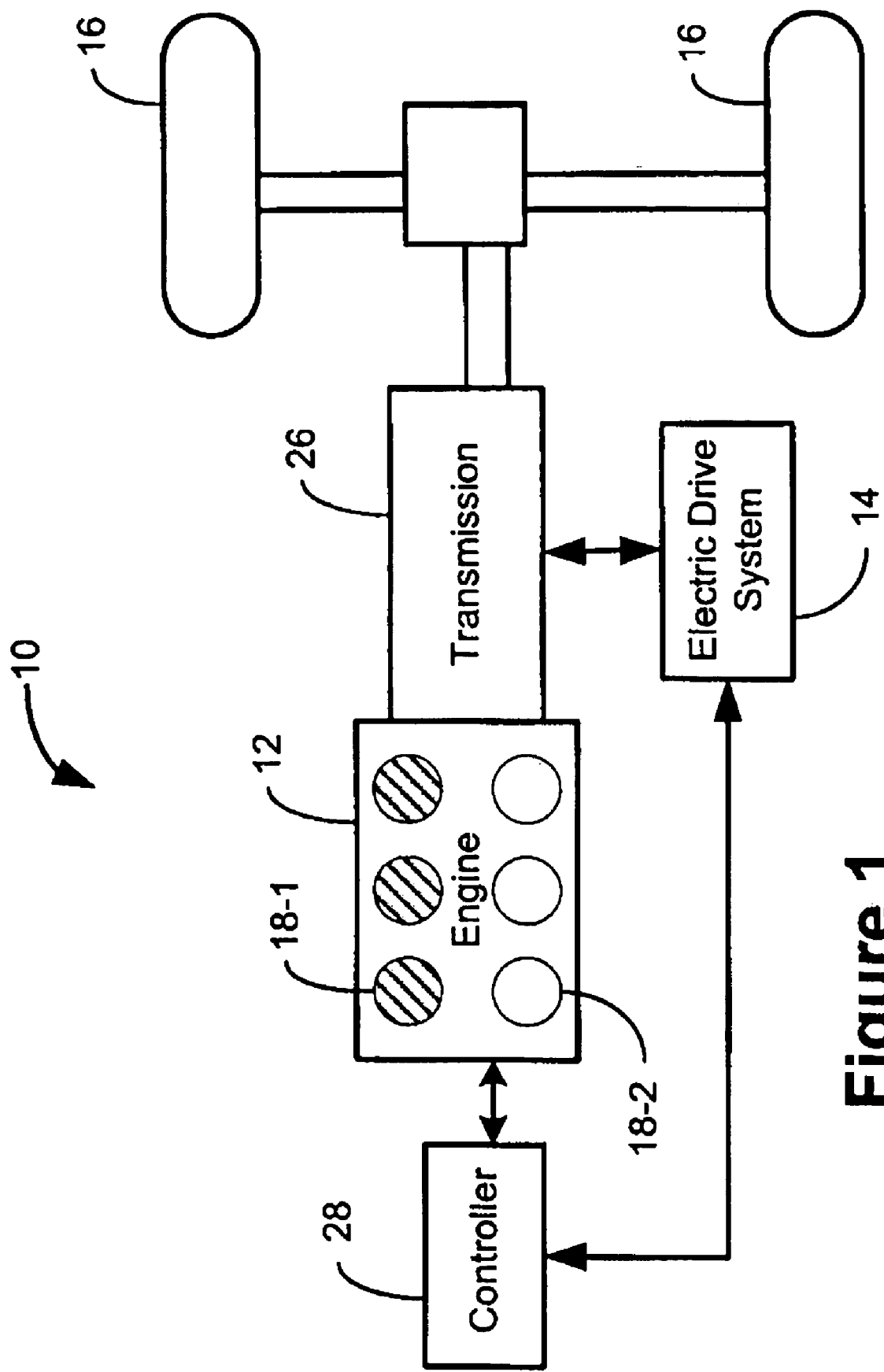
FIG. 1 is a functional block diagram of a parallel HEV with a displacement on demand ICE and a controller that controls the hybrid powertrain during DOD transitions.

The following description of the preferred embodiment(s) is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, or any other suitable components that provide the described functionality. For purposes of clarity, the same reference numbers will be used in the drawings to identify similar elements.

Referring to FIG. 1, a parallel hybrid electric vehicle 10 is shown. The parallel HEV 10 is configured with a displacement on demand ICE 12 and an electric drive system (EDS) 14. One or both can be used to power the wheels 16. The displacement on demand ICE 12 includes N cylinders 18 that are selectively deactivated during engine operation. Although FIG. 1 depicts six cylinders (N=6), it can be appreciated that the ICE 12 may include additional or fewer cylinders 18. For example, engines having 4, 5, 6, 8, 10, 12 and 16 cylinders are contemplated. While FIG. 1 depicts a V6 engine, the engine 12 may also be an in-line engine.

Figure 3:
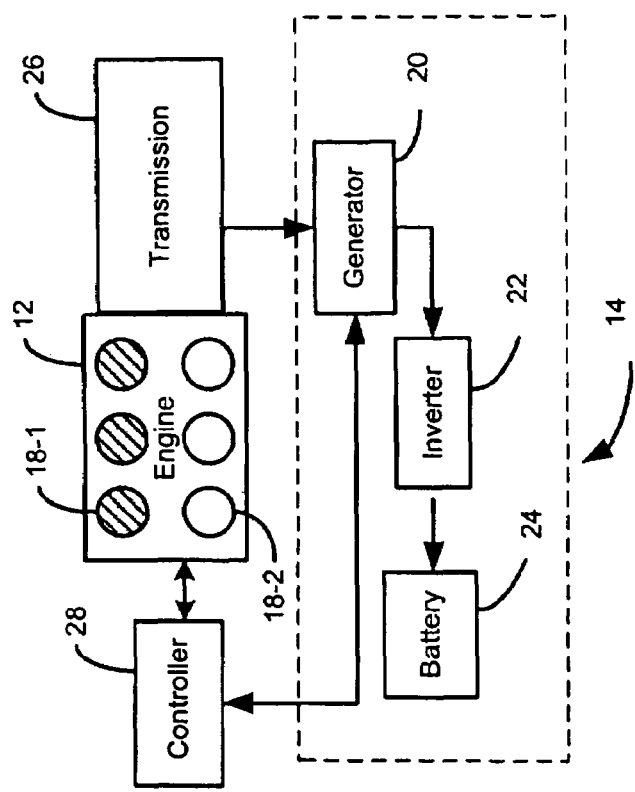
FIG. 3 is a functional block diagram of the torque management system for HEVs upon entering the deactivation transition mode and shortly after entering the activation transition mode.
Figure 2:
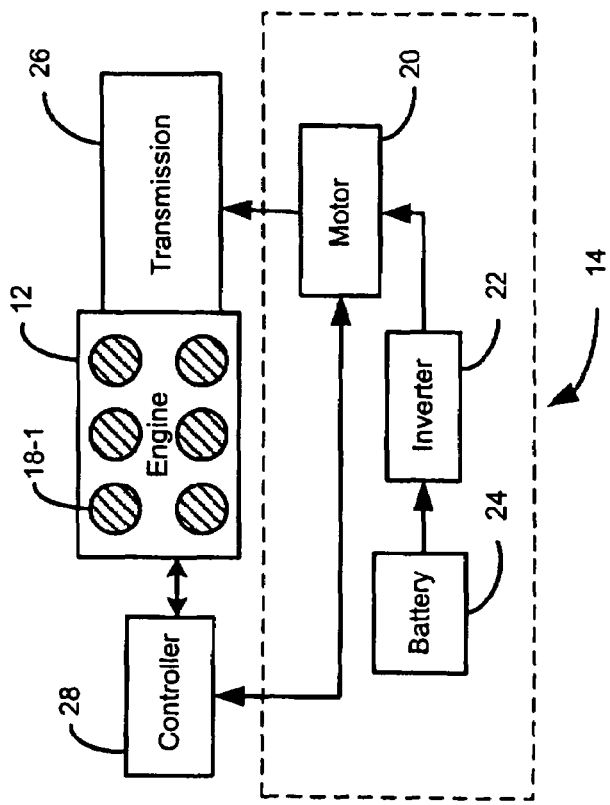
FIG. 2 is a functional block diagram of the torque management system of HEVs upon entering the activation transition mode and shortly after entering the deactivation transition mode.

Referring now to FIGS. 2 and 3, the EDS 14 includes an electric machine 20, an inverter 22 and at least one battery 24. The electric machine 20 functions as either a motor to propel the vehicle 10 through a transmission 26 as shown in FIG. 2 or a generator to charge the battery pack 24 as shown in FIG. 3. The electric machine 20 is preferably an AC induction machine but may comprise any known electrical motor/generator technology including, but not limited to, DC machines, synchronous machines, and switched reluctance machines.

The battery 24 may be a rechargeable battery that stores energy during regenerative braking and charging by the ICE 12. The stored energy is used to power the electric machine 20 as needed. The battery 24 may comprise any suitable battery technology including, but not limited to, lead acid, lithium ion, and lithium polymer batteries.

During periods of light engine load, a controller 28 communicates with the ICE 12 to enable displacement on demand. DOD occurs via deactivation of one or more cylinders 18. The ICE 12 is referred to as operating in a deactivated mode when one or more cylinders are not active. In an exemplary embodiment, N/2 cylinders 18-2 are deactivated. Upon deactivation of the cylinders 18-2, the controller 28 communicates with the ICE 12 to increase the power output of the remaining cylinders 18-1. The cylinders are reactivated upon a request to increase torque. The ICE 12 is referred as operating in an activated mode when all cylinders active.

During transitions between the activated and deactivated modes, momentary fluctuations in engine torque may occur. Such fluctuations, or torque disturbances, are a result of intake manifold filling and depletion, charge in process, and the mechanical response of the deactivation system. Referring now to FIG. 4, the torque management module 30 generates an electric drive system command 32 to smooth the disturbances. The EDS command 32 is based on an engine torque value 34, a desired torque value 36 and a DOD mode 38. An engine torque generator 39 determines the engine torque 34 value from a measured air-flow rate, an air-fuel ratio and/or other environmental considerations. A desired torque generator 40 determines the desired torque 36 from a measured throttle area and/or other environmental considerations. A DOD mode generator 41 determines the DOD mode 38 based on whether the ICE 12 is operating in an activated mode, a deactivated mode, a deactivation transition mode or an activation transition mode.

Figure 5:
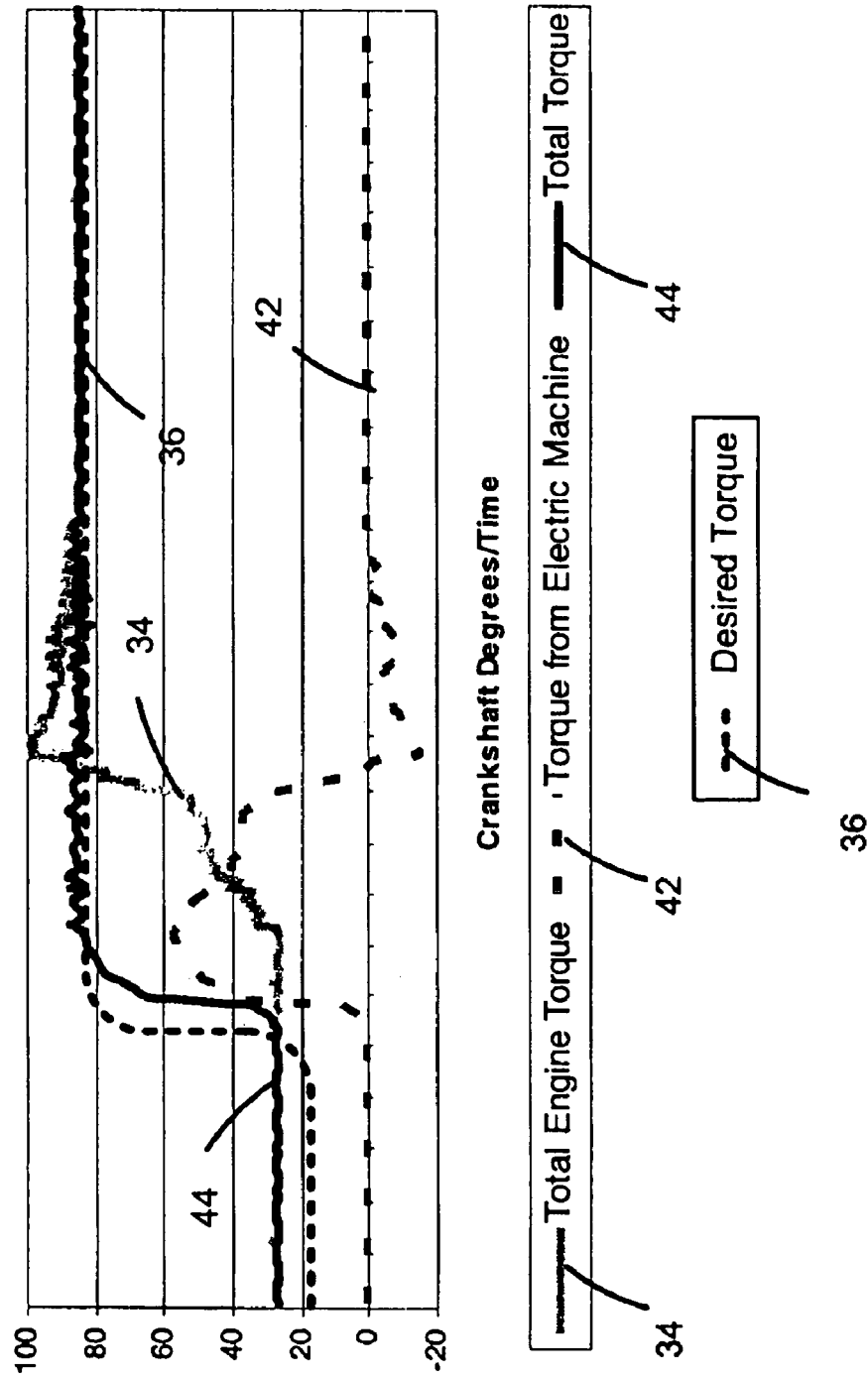
FIG. 5 is a graph representing predicted values of engine torque, electric machine torque and total torque during the activation transition mode with an increased torque demand.
Figure 6:
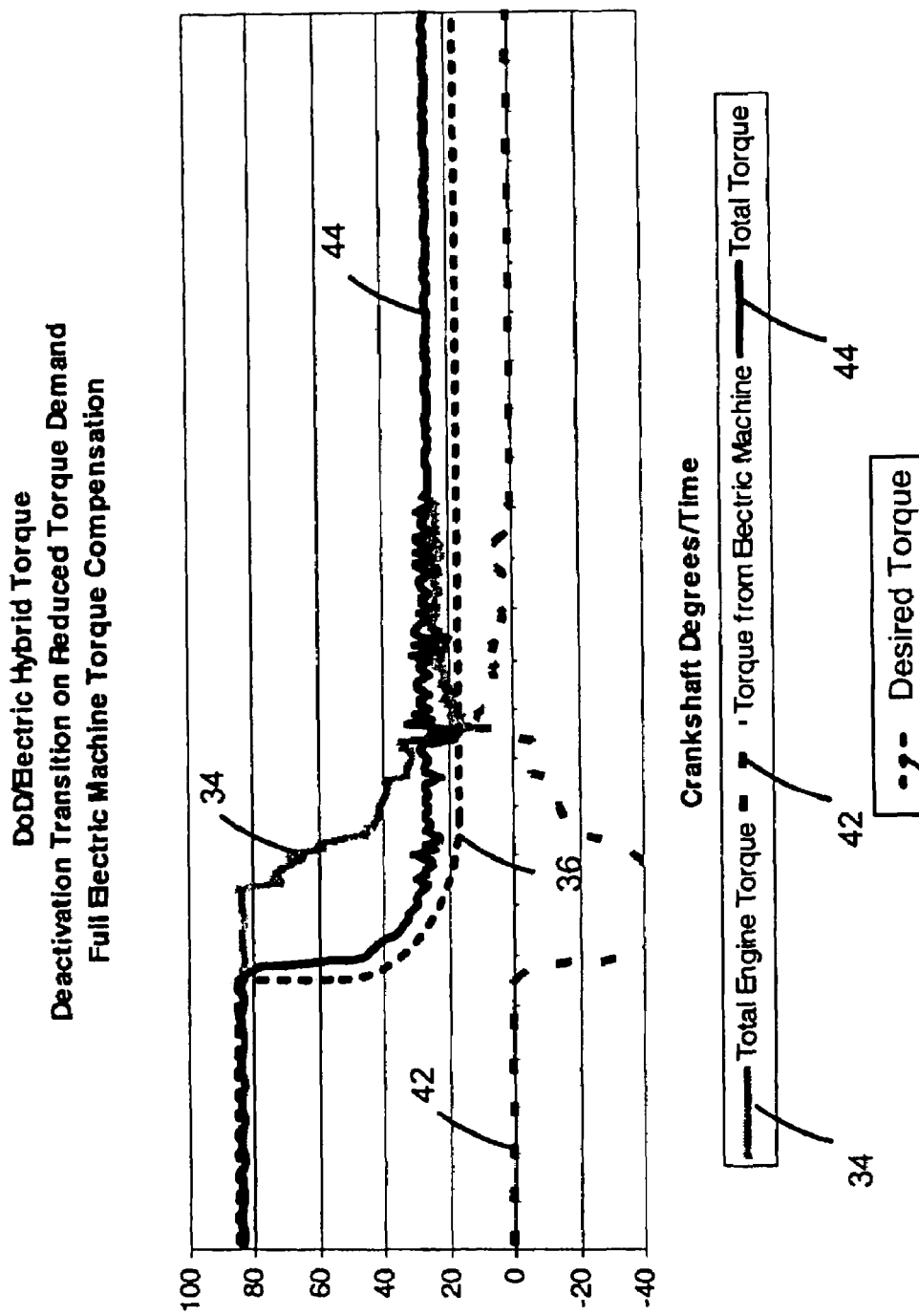
FIG. 6 is a graph representing predicted values of engine torque, electric machine torque and total torque during the deactivation transition mode with a reduced torque demand.

Referring now to FIGS. 5 and 6. The torque management module 30 smoothes torque disturbances by commanding the EDS 14 such that the sum of an electric machine torque 42 and the engine torque 34 is nearly equal to the desired torque 36. FIG. 5 is a graphical representation of predicted electric machine torque 42, predicted engine torque 34 and predicted desired torque 36 that illustrate the predicted effect of the summation on a total torque 44 generated during the activation transition mode. FIG. 6 is a graphical representation of predicted electric machine torque 42, predicted engine torque 34 and predicted desired torque 36 that illustrate the predicted effect of the summation on the total torque 44 generated during the deactivation transition mode.

Figure 7:
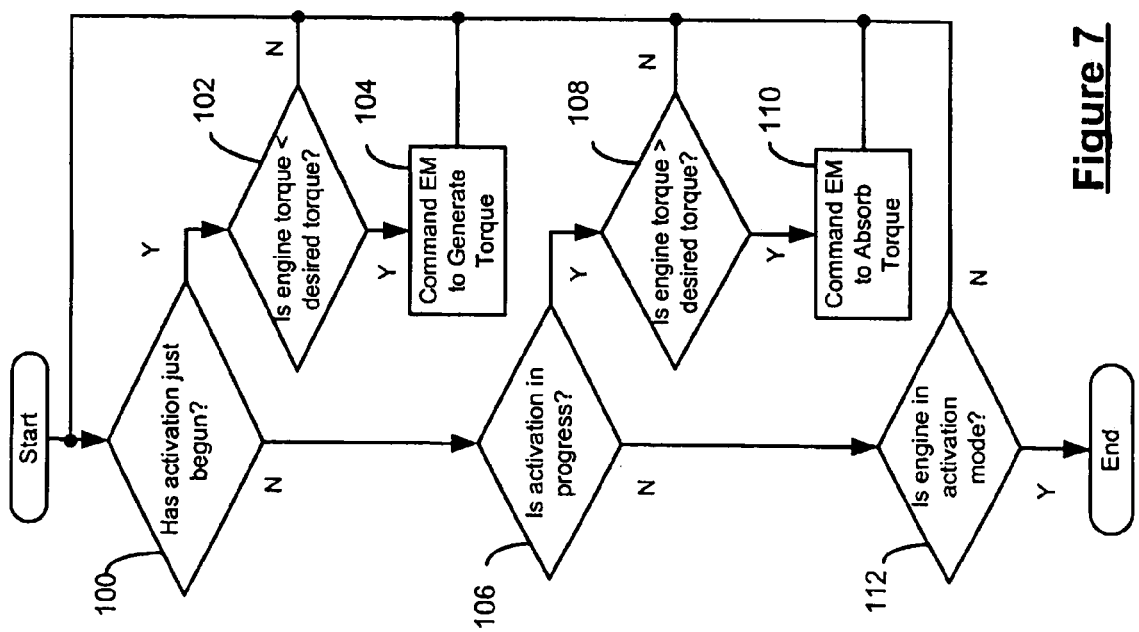
FIG. 7 is a flow chart illustrating the torque management module during the activation transition mode.

Referring now to FIG. 7, the torque management system for the activation transition mode operates as follows. Upon first entering the activation transition mode in step 100, the engine torque 34 and desired torque 36 is evaluated. If the engine torque 34 is less than the desired torque 36 in step 102, the momentary deficit in engine torque 34 can be compensated by commanding the electric machine 20 to convert electricity stored in the battery 24 into electric machine torque 42 in step 104 (also shown in FIG. 3). The electric machine torque 42 is supplied in addition to the engine torque 34.

Shortly after entering the activation transition mode in step 106, the ICE 12 may generate excess torque. If the engine torque 34 is greater than the desired torque 36 in step 108, the electric machine 20 may be commanded to operate as a generator as shown in FIG. 4. In step 110 the electric machine 20 converts the excess torque into electricity and stores the electricity in the battery 24 for later use. Once the ICE reaches the activated mode in step 112, normal operation of the hybrid powertrain occurs.

Figure 8:
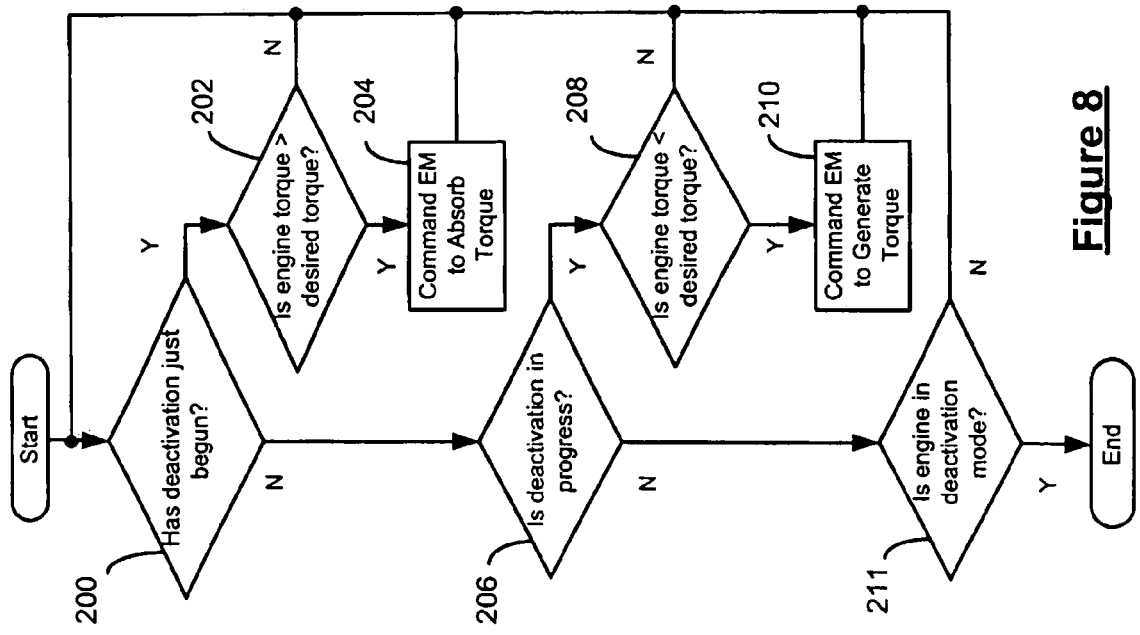
FIG. 8 is a flow chart illustrating the torque management module during the deactivation transition mode.

A converse torque management system applies to the deactivation transition mode. Referring now to FIG. 8, upon first entering the deactivation transition mode in step 200, the ICE 12 generates excess torque. If the engine torque 34 is greater than the desired torque 36 in step 202, the electric machine 20 converts the excess torque into electricity and stores the electricity in the battery 24 for later use in step 204 (also shown in FIG. 3). Shortly after the entering the deactivation transition mode in step 206, a momentary deficit in engine torque 34 occurs. If the engine torque 34 is less than the desired torque 36 in step 208, the electric machine 20 converts the electricity stored in the battery 24 into torque in step 210, as shown in FIG. 3. The electric machine torque 42 is supplied in addition to the engine torque 34. Once the ICE reaches the deactivated mode in step 212, normal operation of the hybrid powertrain occurs.

This method of compensating engine torque 34 at cylinder switching using the electric machine 20 will improve the air-fuel ratio and reduce heating of the exhaust system by eliminating the need to retard the spark. Furthermore, the delivered torque will match more closely to the driver's requested torque.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

The invention claimed is:

1. A method for managing torque in a hybrid electric vehicle with a variable displacement internal combustion engine (ICE), an electric machine and a battery, comprising:
   operating the ICE in an activated mode where all cylinders are active;
   transitioning the ICE from the activated mode to a deactivated mode where the engine is operating with less than all cylinders active; and
   smoothing disturbances in ICE torque during the deactivation transition using the electric machine.

2. The method of claim 1 wherein the step of smoothing disturbances comprises generating electricity from excess ICE torque when the ICE torque is greater than a desired torque.

3. The method of claim 2 further comprising storing the electricity in the battery.

4. The method of claim 1 wherein the step of smoothing disturbances comprises using the electric machine to supply torque when the ICE torque is less than a desired torque.

5. The method of claim 1 further comprising:
transitioning the ICE from the deactivated mode to the activated mode; and
smoothing disturbances in ICE torque during the reactivation transition using the electric machine.

6. The method of claim 5 wherein the step of smoothing disturbances comprises using the electric machine to supply torque when the ICE torque is less than a desired torque.

7. The method of claim 5 wherein the step of smoothing disturbances comprises generating electricity from excess ICE torque when the ICE torque is greater than a desired torque.

8. The method of claim 7 wherein the electricity is stored in the battery.

9. A method for managing torque in a hybrid electric vehicle with a variable displacement internal combustion engine (ICE), an electric machine and a battery, comprising:
operating the ICE in a deactivated mode where the ICE is operating with less than all cylinders active;
transitioning the ICE from the deactivated mode to an activated mode where the ICE is operating with all cylinders active;
smoothing disturbances in ICE torque during the reactivation transition between the deactivated mode and the activated mode using the electric machine; and
wherein the step of smoothing disturbances comprises using the electric machine to generate electricity from excess ICE torque when the ICE torque is greater than a desired torque.

10. The method of claim 9 wherein the electricity is stored in the battery.

11. A method for managing torque in a hybrid electric vehicle with a variable displacement internal combustion engine (ICE), an electric machine and a battery, comprising:
operating the ICE in a deactivated mode where the ICE is operating with less than all cylinders active;
transitioning the ICE from the deactivated mode to an activated mode where the ICE is operating with all cylinders active;
smoothing disturbances in ICE torque during the reactivation transition between the deactivated mode and the activated mode using the electric machine;
transitioning the ICE from the activated mode to the deactivated mode; and
smoothing disturbances in ICE torque during the deactivation transition using the electric machine.

12. The method of claim 11 wherein the step of smoothing disturbances in ICE torque comprises using the electric machine to supply torque when the ICE torque is less than a desired torque.

13. The method of claim 11 wherein the step of smoothing disturbances comprises using the electric machine to generate electricity from excess ICE torque when the ICE torque is greater than a desired torque.

14. The method of claim 13 wherein the electricity is stored in the battery.

15. A torque management system for a hybrid electric vehicle with a variable displacement internal combustion engine (ICE), comprising:
an electric machine; and
a torque management module that smoothes disturbances in ICE torque using the electric machine during transitions from a deactivated mode where the engine is operating with less than all cylinders active to an activated mode where the engine is operating with all cylinders active.

16. The torque management system of claim 15 wherein the torque management module commands the electric machine to generate torque when the displacement on demand ICE first transitions to the activated mode.

17. The torque management system of claim 15 wherein the torque management module commands the electric machine to smooth disturbances during transitions from an activated mode where the engine is operating with all cylinders active to a deactivated mode where the engine is operating with less than all cylinders active.

18. The torque management system of claim 17 wherein the torque management module commands the electric machine to generate torque shortly after the displacement on demand ICE enters the deactivated mode.

19. The torque management system of claim 17 wherein the torque management module commands the electric machine to generate electricity from ICE torque when the ICE enters the deactivated mode.

20. The torque management system of claim 15 wherein the torque management module commands the electric machine to generate electricity from ICE torque shortly after entering the activated mode.

21. The torque management system of claim 15 further comprising: an inverter that is connected to the electric machine; and at least one battery that is connected to the inverter.

22. The torque management system of claim 21 wherein the battery can be at least one of lead acid batteries, lithium ion batteries, and lithium polymer batteries.

23. The torque management system of claim 15 wherein the torque management module commands the electric machine to smooth disturbances in ICE torque when the ICE torque is not equal to a desired torque.

* * * * *